US007304952B2

(12) United States Patent
Scholten

(10) Patent No.: US 7,304,952 B2
(45) Date of Patent: Dec. 4, 2007

(54) PROTOCOL-MAPPING NETWORK ACCESS DEVICE WITH USER-PROVISIONABLE WIDE AREA NETWORK FLOW CONTROL

(75) Inventor: Michael D. Scholten, Westford, MA (US)

(73) Assignee: Applied Micro Circuits Corporation, San Diego, CA (US)

(*) Notice: Subject to any disclaimer, the term of this patent is extended or adjusted under 35 U.S.C. 154(b) by 1046 days.

(21) Appl. No.: 10/151,792

(22) Filed: May 21, 2002

(65) Prior Publication Data
US 2003/0218981 A1  Nov. 27, 2003

(51) Int. Cl.
G06F 11/00 (2006.01)
H04J 1/16 (2006.01)
H04L 1/00 (2006.01)
H04L 12/26 (2006.01)

(52) U.S. Cl. .................. 370/235; 370/229; 370/230.1; 370/231; 370/232

(58) Field of Classification Search ................. 370/235, 370/232, 233, 234, 229, 231, 352, 401, 468, 370/230, 230.1; 710/29
See application file for complete search history.

(56) References Cited

U.S. PATENT DOCUMENTS

| | | | |
|---|---|---|---|
| 6,628,617 B1 * | 9/2003 | Karol et al. ................ | 370/237 |
| RE38,309 E * | 11/2003 | Frazier et al. ............... | 370/231 |
| 6,721,273 B1 * | 4/2004 | Lyon ......................... | 370/235 |
| 6,810,037 B1 * | 10/2004 | Kalapathy et al. .......... | 370/392 |
| 6,879,590 B2 * | 4/2005 | Pedersen et al. ............ | 370/394 |
| 6,912,557 B1 * | 6/2005 | North et al. ................ | 708/490 |
| 6,912,603 B2 * | 6/2005 | Kanazashi ................... | 710/29 |
| 2003/0021229 A1 * | 1/2003 | Kadambi et al. ........... | 370/229 |
| 2003/0210651 A1 * | 11/2003 | Tzeng et al. ................ | 370/231 |
| 2004/0054733 A1 * | 3/2004 | Weeks ........................ | 709/206 |
| 2006/0020678 A1 * | 1/2006 | Kessler et al. .............. | 709/207 |

OTHER PUBLICATIONS

Lucent Technologies Inc., "Dual-Gigabit Ethernet Over SONET/SDH", Microelectronics Group, Advanced Data Sheet (Nov. 2000).
PMC-Sierra, Inc., "PM3386—S/UNI-2XGE Technical Overview", Issue 1, PMC-1991728, www.pmc-sierra.com (Oct. 2000).

* cited by examiner

*Primary Examiner*—Jay K. Patel
*Assistant Examiner*—Chuong T. Ho
(74) *Attorney, Agent, or Firm*—Weingarten, Schurgin, Gagnebin & Lebovici LLP

(57) ABSTRACT

In a technique for performing flow control in a wide-area network, a user-specified flow control message such as a Pause message is provisioned at a first node, and a user-specified flow control message filter is provisioned at a second node coupled to the first node. At the first node, the availability of a buffer for data received from the second node is monitored, and in response to a predetermined availability condition, the provisioned flow control message is sent to the second node. In a Pause/Resume protocol, the buffer may be monitored for an Almost Full condition, and the flow control message may be a Pause message indicating that the first node should suspend transmission. The second node compares messages from the first node against the flow control message filter. Upon detecting the flow control message from the first node, the second node takes a predetermined flow control action with respect to the transmission of data to the first node. In the case of a Pause/Resume protocol, the flow control action may be to stop transmission for a specified period.

50 Claims, 4 Drawing Sheets

PROTOCOL-MAPPING NETWORK ACCESS DEVICE WITH USER-PROVISIONABLE WIDE AREA NETWORK FLOW CONTROL

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention relates to the field of flow control in wide-area networks.

Data communications networks often employ a technique referred to as "flow control" to manage the transmission of data among network nodes. Generally, "flow control" refers to techniques for making the transmission of data from one node to another conditional upon some real-time criteria, such as whether there is sufficient buffer space at a receiver to receive a transmission, or whether the transmitter is complying with a specified transmission rate. There are different types of flow control mechanisms or protocols. On network links employing the Gigabit Ethernet data communications protocol, for example, a mechanism using Pause and Resume messages is utilized. When a receiver senses that receive buffers are close to full, it sends a Pause message to the transmitter indicating that the transmitter should stop transmission for a specified time. Later, when the buffers have become emptier, the receiver sends a Resume message indicating that transmission can be resumed. This Pause/Resume protocol keeps the risk of buffer overrun and loss of data at an acceptably low level.

Data communications networks often have a hybrid nature, such that an end-to-end data communications path traverses links or subnetworks that employ different transmission protocols. At the interfaces between subnetworks of different types, devices that perform encapsulation, protocol mapping, and related functions are used to enable the successful transfer of data from one subnetwork to another. The different subnetworks may use different flow control protocols, or in some cases a subnetwork using a flow control protocol may be connected to another subnetwork that does not. One configuration is the interconnection of two or more relatively local links, such as Gigabit Ethernet (GbE) links, via a more wide-area network, such as a Synchronous Optical Network (SONET) long-haul network. In such a configuration, the wide-area network (WAN) serves as a transport medium for the traffic of the local links, i.e., it functions much as a wire that simply moves data from one GbE link to another without participating in the GbE protocols. SONET, for example, has no provision for flow control, either internally or in relation to external network segments such as GbE links.

It may be desirable in networks having local-area segments interconnected by a WAN to employ flow control within the WAN in addition to whatever flow control is used on the local segments. However, for some WANs, such as SONET-based WANs, there may be no specification of a flow-control protocol, nor any anticipation of a need for flow control. Additionally, it may be desirable that protocol-mapping network devices used at the edges of a WAN be operable with different types of attached local networks, so that it may be necessary to support different flow control protocols or different methods for enabling subnetworks using different flow control protocols to interoperate with each other. Therefore, there is a need for mechanisms that can be flexibly utilized for flow control in a wide-area network and protocol-mapping devices attached thereto.

BRIEF SUMMARY OF THE INVENTION

In accordance with the present invention, an apparatus and method are disclosed for performing flow control in a flexible manner in a wide-area network.

A user-specified flow control message is provisioned at a first node, and a user-specified flow control message filter is provisioned at a second node coupled to the first node. In one embodiment, the flow control message may be provisioned as a Pause message, and the flow control message filter provisioned to recognize the Pause message when received at the second node.

At the first node, the availability of a buffer temporarily storing user data received from the second node is monitored, and in response to a predetermined availability condition of the buffer, the provisioned flow control message is sent to the second node. In a Pause/Resume protocol, for example, the buffer may be monitored for an Almost Full condition, and upon such condition being detected, a Pause message is sent indicating that the first node should suspend transmission for a specified period of time.

The second node continually compares messages received from the first node against the provisioned flow control message filter. Upon detecting the receipt of the flow control message sent from the first node, the second node takes a predetermined flow control action with respect to the transmission of user data to the first node. In the case of a Pause/Resume protocol, the flow control action may be to stop transmission for the specified period.

The user provisioning of the flow control message and flow control message filter provide flexibility in the type of flow control protocols that can be supported and the manner in which they are implemented in a given system. A user can provision the flow control message to have a particular structure that is advantageous in a given system, and then provision the filter in a corresponding fashion.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

Figure 1:
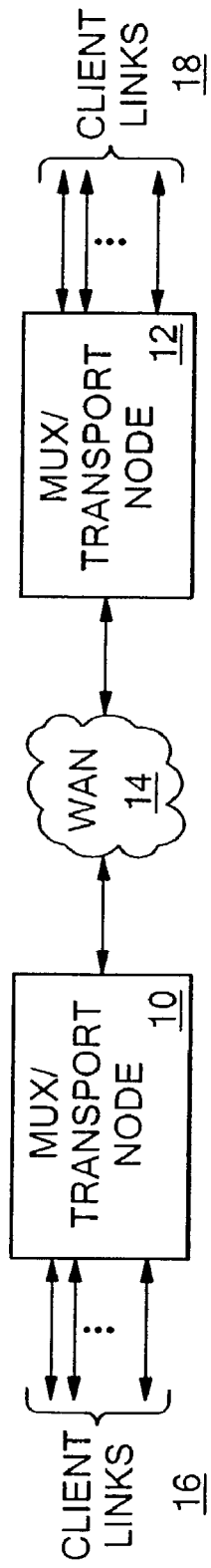
FIG. 1 is a block diagram of a network in accordance with the present invention.

In FIG. 1, multiplexer/transport (mux/transport) nodes 10 and 12 are connected between a wide-area network (WAN) 14 and respective sets of client links 16 and 18. The WAN 14 is a long-haul, circuit-oriented network such as a Synchronous Optical Network (SONET) network or the emerging Optical Transport Network (OTN). The client links 16 and 18 are high-speed connections to client data network devices such as switches or routers (not shown), such as Gigabit Ethernet (GbE) or Fibre Channel (FC) links. As shown, there are several client links 16 and 18 connected to the respective mux/transport nodes 10 and 12. The mux/transport nodes 10 and 12 provide for multiplexing and demultiplexing client data streams from the client links 16 and 18 to and from higher-rate data streams carried in the WAN 14. The mux/transport nodes 10 and 12 also perform other functions pertaining to the transport of the client data streams through the WAN 14, including for example data buffering, channel allocation, performance monitoring, flow control, and other functions.

Generally, the client links 16 are distinguished from the WAN 14 by the relative distances over which they are specified to operate. GbE links, for example, are typically specified to operate over a distance of 5-10 km. for single-mode fiber, and considerably shorter distances for other physical transmission media. A SONET link, however, is specified to operate over distances as long as hundreds of kilometers. These differences give rise to different operational characteristics. In particular, it is common to employ a flow control mechanism on shorter-distance data links such as the client links 16, whereas flow control has generally not been utilized on long-haul links such as used in the WAN 14. The term "flow control" refers to the ability of a data receiver to influence the pattern of data transmission from a corresponding data transmitter, so as to provide for high data throughput while minimizing the risk of data loss due to buffer overflow at the receiver. In long-haul networks, it has generally been the responsibility of equipment at the transmitting end to conform the transmission rate to the transmission capacity available on the long-haul link, without relying on any flow-control mechanism on the link itself.

Client data frames received from the client links 16 and 18 by a mux/transport node 10 or 12 are re-framed or encapsulated for transmission through the WAN 14. One known framing protocol is referred to as High Level Data Link Control (HDLC), and an emerging encapsulation technique is referred to as Generic Framing Procedure (GFP). In addition to providing adaptation between the frame format of the client links 16, 18 and that of the WAN 14, re-framing or encapsulation logic can also provide protocol support for ancillary operational features that may be desirable from a system perspective. For example, GFP allows for the definition of "client management" frames that can be exchanged between devices for various purposes, such as exchanging performance monitoring information or reporting events such as Client Signal Fail (CSF). As described below, such an ancillary function of the WAN 14 is utilized to carry flow-control messages between the mux/transport nodes 10 and 12 as part of a flow control scheme in the WAN 14. Such ancillary traffic may be carried over the same physical path(s) through the WAN 14 as the related user data, but occupies logical channels that are separate from the user data streams.

Figure 2:
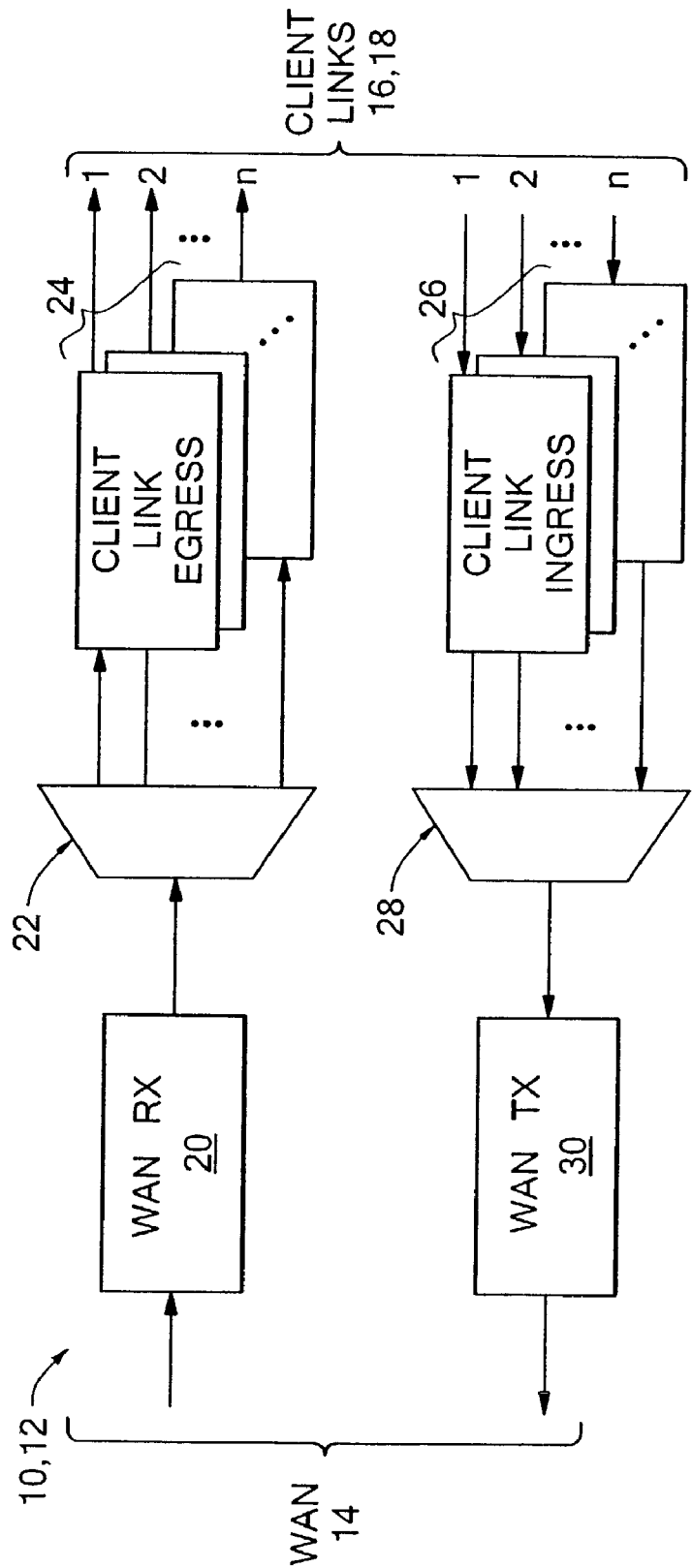
FIG. 2 is a block diagram of a multiplexer/transport node in the network of FIG. 1.

FIG. 2 shows the general structure of a mux/transport node 10 or 12. Traffic from the WAN 14 is received by a WAN receive (RX) section 20. The components of the received traffic that are associated with the different client links 16 or 18 are routed through a demultiplexer 22 to a corresponding one of a plurality of client link egress processing sections 24, wherein each section 24 provides the transmit function for a single associated client link 16 or 18. The demultiplexer 22 separates the traffic of the different client links 16 or 18, and may be implemented in a variety of ways. In a SONET WAN, for example, different "virtual channels" (VCs) or groups of base STS-1 signals can carry the traffic associated with the different links 16 or 18, and the demultiplexer 22 may take the form of a buffer employing an addressing scheme based on numeric identifiers of the different VCs. The outputs of the demultiplexer 22 are the data streams carried in the various VCs.

In the other direction, traffic from the client links 16 or 18 is received by a group of client link ingress sections 26, and then provided through a multiplexer 28 to a WAN transmit (TX) section 30, from which it is transmitted on the WAN 14. As with the demultiplexer 22, the multiplexer 28 may be implemented in a variety of ways. In a SONET WAN, the output of the multiplexer 28 is a single high-rate, VC-organized data stream carrying the traffic from the various client links 16 or 18. This data stream is further processed by the WAN TX section 30 to create a complete multiplexed STS signal, such as an STS-48 signal, for transmission on the WAN 14.

Figure 3:
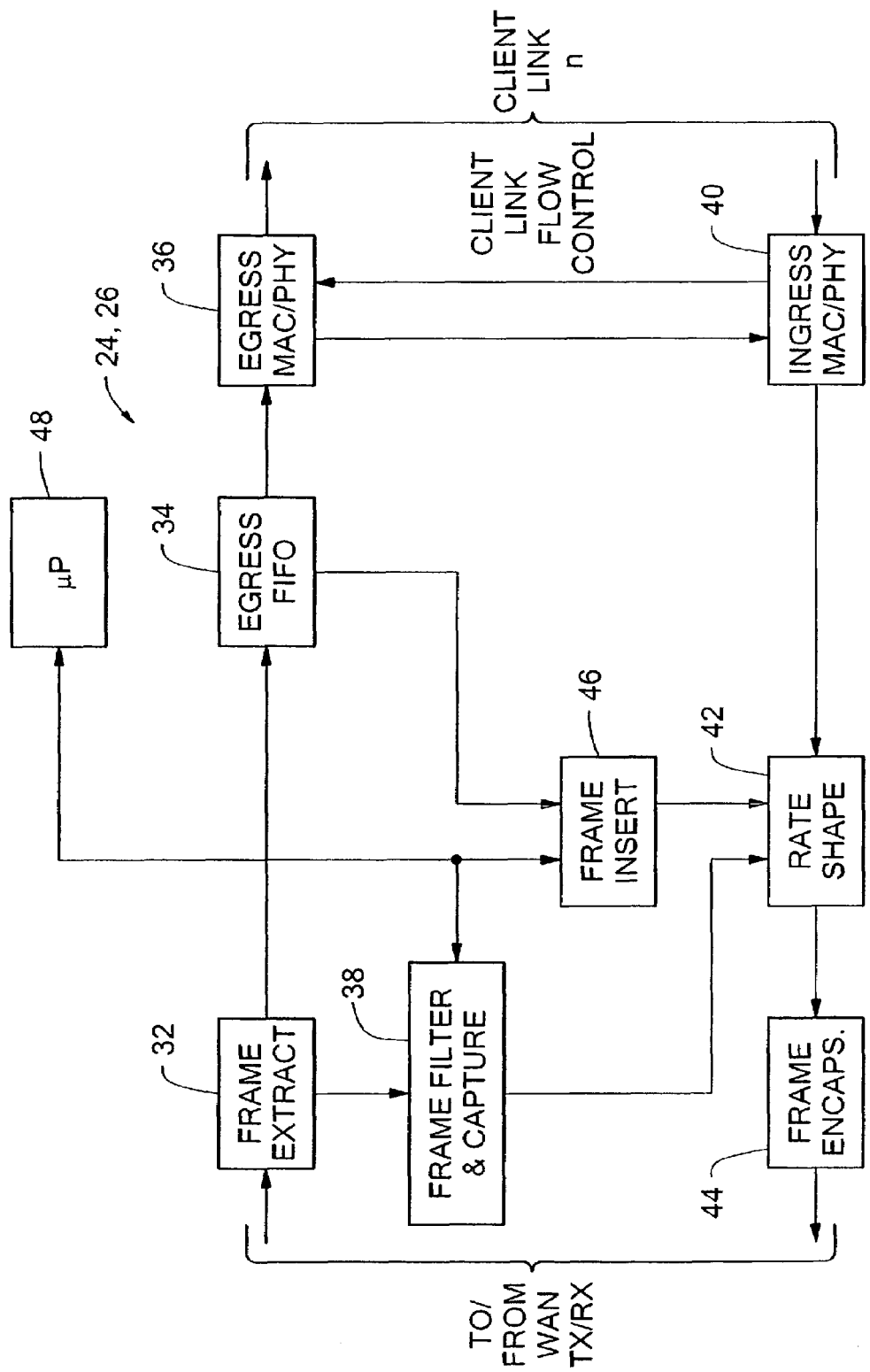
FIG. 3 is a block diagram of processing logic for a client link in the multiplexer/transport node of FIG. 2.

FIG. 3 shows the combined structure of a client link egress section 24 and a client link ingress section 26 for a given client link 16 or 18. The egress path includes frame extraction logic 32, an egress FIFO buffer 34, and an egress MAC/PHY section 36 that performs media access control (MAC) and physical layer (PHY) functions. The frame extraction logic 32 provides egress frames to frame filter and capture logic 38, whose function is described below. The ingress path includes an ingress MAC/PHY section 40, rate shaping logic 42, and frame encapsulation logic 44. As shown, the ingress MAC/PHY section 40 exchanges client link flow control information with the egress MAC/PHY section 36. Frame insertion logic 46 is coupled to the rate shaping logic 42. The frame insertion logic 46 receives input signals from the egress FIFO buffer 34. Also shown is a microprocessor 48 responsible for provisioning and other control functions.

The frame insertion logic 46 includes two frame buffers whose contents are provisionable by the microprocessor 48, and which are conditionally inserted into the stream of ingress frames in response to a hardware trigger event as described in more detail below. Each buffer is used to store a single frame, and has a storage area that dictates the maximum-sized frame that can be stored. For purposes of flow control signaling, a storage area for each buffer of 127 bytes may be more than adequate. The exact length of a provisioned frame in each buffer is programmed by the microprocessor 48, so that the correct number of bytes for the frame are played out when the frame is inserted into the data stream.

The triggers for insertion of each buffer of the frame insertion logic 46 into the ingress data stream are also programmed by the microprocessor 48. These are summarized below:

| Code | Trigger |
|------|---------|
| 0 | No triggers active |
| 1 | Insert on egress buffer almost full |
| 2 | Insert on egress buffer almost empty |

It will be appreciated that trigger #1, "insert on almost full", is useful for generating flow-control frames that reduce or stop transmission from the far end, and that trigger #2, "insert on almost empty", is useful for generating flow-control frames that increase or resume transmission from the far end. The use of these triggers for specific flow-control protocols is described below.

The frame filter and capture logic 38 includes two frame filters whose contents are provisionable by the microprocessor 48, and which can be used to detect flow control frames in the egress direction and initiate corresponding flow control actions. The filters specify bit patterns that must be found in a predetermined location in received frames to declare a match. In connection with each filter is a corresponding provisionable mask that specifies the bits of a frame to be compared with corresponding filter bits, all other bits being deemed "don't cares". In one embodiment, each filter and mask is 8 bytes in length, and the filter is compared with the 8 bytes immediately following the "core header" of each received egress frame. Exemplary frame structures and a description of the "core header" appear below.

The actions to be taken upon the occurrence of a match between each filter and a received frame are programmed by the microprocessor 48, and are summarized below:

| Code | Action |
| --- | --- |
| 0 | No action |
| 1 | Signal the rate shaping logic 42 to pause or resume frame transmission, depending on which filter is matched; discard received frame. |

In the above, the function of pausing or resuming frame transmission is hard-associated with the identity of the filter. That is, if a given frame matches filter #1, for example, then the frame is interpreted as a Pause frame, and if the frame matches filter #2, then the frame is interpreted as a Resume frame. In alternative embodiments, it may be useful for this association to itself be provisionable, thus permitting a user to assign either function (pausing or resuming) to a given filter. Also, in different flow-control protocols it may be desirable to employ more or less than two filters.

Figure 4:
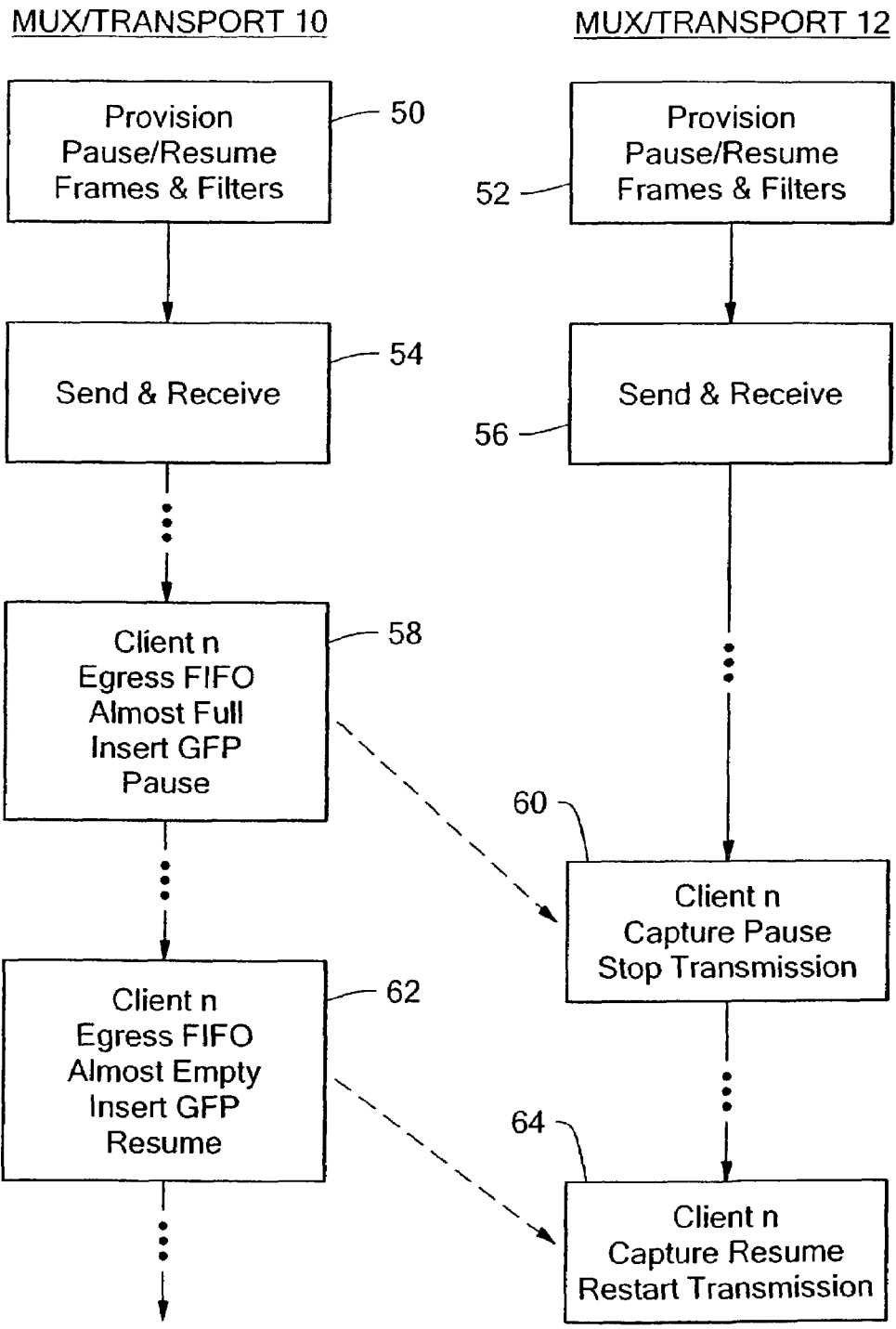
FIG. 4 is a flow diagram depicting the operation of a pair of multiplexer/transport nodes in the network of FIG. 1.

FIG. 4 illustrates the flow-control related operation of the mux/transport nodes 10 and 12 of FIG. 1. At steps 50 and 52, the microprocessor 48 in each node 10 and 12 provisions a Pause frame, a Resume frame, a Pause filter, and a Resume filter. It will be appreciated that the provisioned frames must be consistent with the provisioned filters, i.e., that the Pause filter as provisioned will detect the Pause frame as provisioned, and likewise with the Resume filter and frame. Beyond this requirement and a few others, such as the 8-byte limit on filter size and any requirements of the encapsulation protocol being utilized, the frames and filters may be defined in any convenient way. It may be convenient to define the Resume frame as a special type of Pause frame, e.g., as a Pause frame with a Pause time of 0 (zero). However, other formats may be used.

At steps 54 and 56, the nodes 10 and 12 exchange user data frames via the WAN 14.

At step 58, it is detected at node 10 that the egress FIFO 34 for client "n" is Almost Full. The definition of Almost Full varies depending on several considerations in a given system, such as the size of the FIFO 34, the round-trip delay in the WAN 14, etc. It may be advantageous to make the Almost Full threshold user-provisionable for greater flexibility. As a result of the detection of Almost Full, a Pause frame is inserted in the stream of ingress frames for this client. The Pause frame specifies a provisioned non-zero time for which transmission on behalf of this client should be suspended.

At step 60, frame filter and capture logic 38 at the node 12 captures the Pause frame from the stream of egress frames, and signals the rate shaping logic 42 to cease transmission of ingress frames for this client. It will be appreciated that if transmission is interrupted long enough, the local client link flow control may be activated to prevent buffers (not shown) within the ingress MAC/PHY section 40 from overflowing.

At step 62, it is detected at node 10 that the egress FIFO 34 for client "n" is Almost Empty. The definition of Almost Empty varies depending on several considerations in a given system, as described above for Almost Full. As a result of the detection of Almost Empty, a Resume frame is inserted in the stream of ingress frames for this client. At step 64, the Resume frame is captured by the node 12, which triggers the re-starting of the transmission of ingress frames for this client.

It will be appreciated that the process depicted in FIG. 4 is generally carried out in the reverse direction as well, between mux/transport node 12 and mux/transport node 10.

In the above description, it is assumed that the flow of frames in the same direction as the Pause and Resume messages is not itself paused. However, this is not a necessary condition, and in fact in operation the opposite may often be true, i.e., a Pause or Resume message must be sent when the flow of frames to the remote node is paused. Because of the critical importance of sending and receiving Pause and Resume messages under a variety of operational circumstances, these message must have greater priority for transmission and reception than more routine messages, such as user data frames. This explains why the frame filter and capture logic 38 resides ahead of the egress FIFO 34 in the egress data path. Also, provision must be made in the rate shaping logic 42 to enable the insertion of Pause and Resume frames whether or not the transmission of lower-priority frames is paused.

Figure 5:
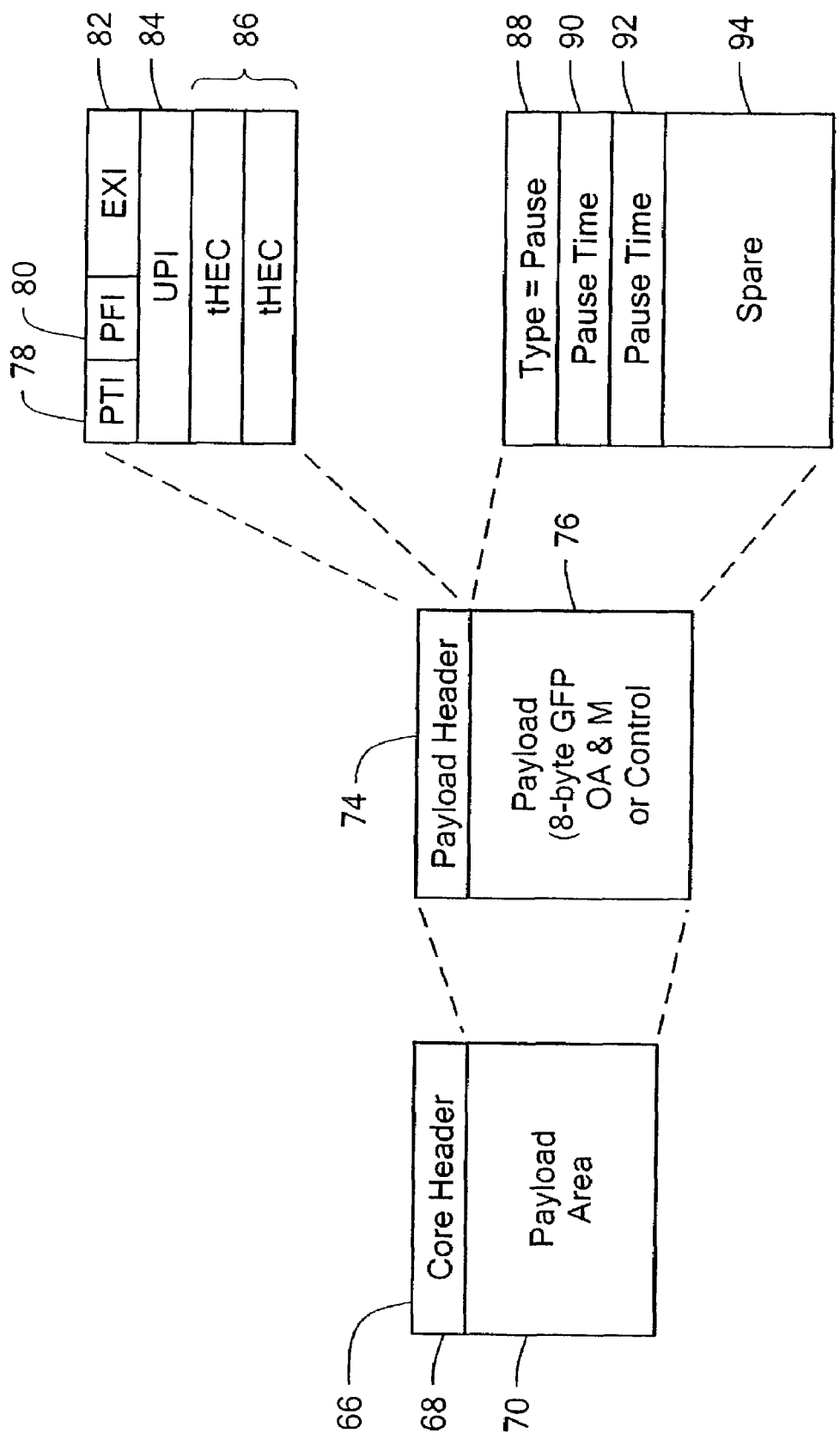
FIG. 5 is a diagram showing the structure of flow-control messages used in the network of FIG. 1.

FIG. 5 shows the structure of the GFP Pause and Resume frames. The overall frame structure is shown at 66, and includes a core header 68 and payload area 70. The payload area includes a payload header 74 and payload 76, which in this case is an 8-byte Client Management Frame (CMF) or control payload. The payload header 74 includes a payload type indicator (PTI) 78, payload FCS indicator (PFI) 80, extension header identifier (EXI) 82, user payload identifier (UPI) 84, and type header error control (tHEC) bytes 86. For the Pause and Resume frames, the value of PTI 78 indicates "Client Management". Both PFI 80 and EXI 82 indicate null values (i.e., that no FCS or extension header is employed), and UPI 84 indicates that the user control payload is a Pause/Resume frame.

The payload 76 contains a type identifier 88 indicating a Pause message and two bytes 90 and 92 constituting a Pause time (MSB and LSB respectively). As previously indicated, a Resume message is a Pause message with a zero pause time 90, 92. The remaining bytes of the payload 76 constitute spare bytes 94.

While in the above description, completely user-specified Pause and Resume frames can be provisioned in the frame insertion logic 46 for use in flow-control operations, in alternative embodiments it may be convenient to hard-wire portions of these frames and allow more limited user provisioning. In particular, it may be convenient to hard-wire much of the contents of a GFP CMF Pause/Resume frame as described above with reference to FIG. 5, and allow the user to provision only the Pause time. In such a case, both the frame as defined in the frame insertion logic 46 and the filter as defined in the frame filter and capture logic 38 consist of a predefined pattern of logic 0s and 1s, which can be implemented very compactly, and only enough writeable storage to hold the variable pause time.

With respect to the use of hard-wired frames and filters versus the more fully provisionable frames and filters as described above, it will be appreciated that there is a trade-off between greater logic efficiency (i.e. compactness) and greater flexibility and versatility. With the more generic provisioning approach described above, it is easier to operate the mux/transport node 12 with protocols other than GFP, for example, or to change the structure of the payload 76 as system needs may dictate. One particular use of the generic capability may be in FibreChannel systems, which employ a credit-based flow control scheme in contrast to the pause/ resume scheme described above. Using the generic provisioning of flow control frames as described above, it may be easier to create flow-control frames that function similar to Pause and Resume frames but are understood by credit-based flow-control logic. Other applications of the generic provisioning capability are also possible.

Additionally, in alternative embodiments it may be convenient to use other than two provisionable flow control frames, depending on the type of flow control protocol, operating conditions, and other circumstances.

It will be apparent to those skilled in the art that other modifications to and variations of the disclosed methods and apparatus are possible without departing from the inventive concepts disclosed herein, and therefore the invention should not be viewed as limited except to the full scope and spirit of the appended claims.

What is claimed is:

1. A method of performing flow control in a network, comprising:
   provisioning a user-specified flow control message at a first node;
   provisioning a user-specified flow control pause message filter and a user-specified flow control resume message filter at a second node coupled to the first node;
   at the first node, monitoring availability of a buffer temporarily storing user data received from the second node, and in response to a predetermined availability condition of the buffer, sending the provisioned flow control message to the second node; and
   at the second node, continually comparing messages received from the first node against each of the provisioned flow control pause and resume message filters to detect the receipt of a respective flow control message, and upon detecting the receipt of the respective flow control message sent from the first node, taking a respective predetermined flow control action with respect to the transmission of user data to the first node,
   wherein (1) provisioning the flow control message comprises provisioning a predetermined portion of the flow control message, the remainder of flow control message being hard-wired, and (2) provisioning the flow control pause and resume message filters comprise provisioning a predetermined portion of the flow control pause message filter and a predetermined portion of the flow control resume message filter, the remainder of the flow control pause and resume message filters being hard-wired.

2. A method according to claim 1, wherein the flow control message is a pause message, the predetermined buffer availability condition is a predetermined buffer fullness, and the predetermined flow control action is stopping transmission of the user data from the second node to the first node.

3. A method according to claim 1, wherein the flow control message is a pause message, the predetermined buffer availability condition is a first predetermined buffer fullness, and the predetermined flow control action is stopping transmission of the user data from the second node to the first node, and further comprising:
   provisioning a user-specified resume message at the first node;
   at the first node, in response to a second predetermined buffer fullness condition, sending the provisioned resume message to the second node; and
   at the second node, continually comparing messages received from the first node against the provisioned resume message filter to detect the receipt of a resume message, and upon detecting the receipt of the resume message sent from the first node, resuming the transmission of the user data to the first node.

4. A method according to claim 1, wherein the entire flow control message and the flow control pause and resume message filters are provisionable, and wherein provisioning the flow control message and flow control pause and resume message filter comprises provisioning the entirety of each.

5. A method according to claim 4, wherein at least one of the flow control pause and resume message filters is compared against a predetermined part and not the entirety of the flow control message.

6. A method according to claim 5, wherein the predetermined part constitutes a predetermined beginning portion of the flow control message.

7. A method according to claim 6, wherein the predetermined beginning portion constitutes a predetermined number of bytes.

8. A method according to claim 1, wherein the flow control action is taken in response to control information provisioned at the second node, and further comprising provisioning the control information at the second node.

9. A method according to claim 8, wherein the control information specifies in one state that the flow control action is to be taken, and specifies in another state that no action is to be taken.

10. A method according to claim 1, wherein the buffer availability condition is a predetermined buffer fullness condition.

11. A method according to claim 10, wherein the predetermined buffer fullness condition is user specified.

12. A method according to claim 1, wherein the network includes multiple client links coupled to the first node, and wherein (1) the buffer is a first buffer of a plurality of buffers, each of the buffers being associated with a corresponding one of the client links, (2) the user data is first user data destined for the client link associated with the first buffer, the first user data being carried in a first of a plurality of logical data channels carrying user data destined for corresponding ones of the client links, and (3) the flow control message is a first flow control message carried in a first of a plurality of logical control channels carrying flow control messages pertaining to corresponding ones of the client links.

13. A method of performing flow control in a network, comprising:
   provisioning user-specified pause and resume frames at a first node;
   provisioning a user-specified pause frame filter and a user-specified resume frame filter at a second node coupled to the first node;
   at the first node, detecting that a buffer temporarily storing frames of a stream of frames received from the second node has reached a first predetermined fullness, and in response to the detection of the first fullness condition sending the provisioned pause frame to the second node;

at the second node, continually comparing frames received from the first node against the provisioned pause frame filter to detect the receipt of a pause frame, and upon detecting the receipt of the pause frame sent from the first node, stopping the transmission of the stream of frames to the first node;

at the first node, detecting that the buffer has reached a second predetermined fullness less than the first predetermined fullness, and in response to the detection of the second fullness condition sending the provisioned resume frame to the second node; and at the second node, continually comparing frames received from the first node against the provisioned resume frame filter to detect the receipt of a resume frame, and upon detecting the receipt of the resume frame sent by the first node, resuming the transmission of the stream of frames to the first node.

14. A method according to claim 13, wherein the entire pause message, the entire resume message, the entire pause message filter, and the entire resume message filter are provisionable, and wherein provisioning the pause and resume messages and the pause and resume message filters comprises provisioning the entirety of each.

15. A method according to claim 14, wherein the pause and resume message filters are each compared against a predetermined part and not the entirety of the corresponding message.

16. A method according to claim 15, wherein the predetermined part constitutes a predetermined beginning portion of the message.

17. A method according to claim 16, wherein the predetermined beginning portion constitutes a predetermined number of bytes.

18. A method according to claim 13, wherein (1) provisioning the pause and resume messages comprises provisioning a predetermined portion of each message, the remainder of each message being hard-wired, and (2) provisioning the pause and resume message filters comprises provisioning a predetermined portion of each of the pause and the resume message filters, the remainder of each message filter being hard-wired.

19. A method according to claim 13, wherein the stopping of transmission is done in response to control information provisioned at the second node, and further comprising provisioning the control information at the second node.

20. A method according to claim 19, wherein the control information specifies in one state that transmission is to be stopped upon receipt of the pause message, and specifies in another state that no action is to be taken upon receipt of the pause message.

21. A network, comprising:

a first node including a buffer, message insertion logic, and a processor operative to provision a user-specified flow control message in the message insertion logic; and a second node coupled to the first node, the second node including message filtering and capturing logic, rate shaping logic, and a processor operative to provision a user-specified flow control pause message filter and a user-specified flow control resume message filter in the message filtering and capturing logic;

the buffer of the first node being operative to indicate its availability for temporarily storing user data received from the second node, and the message insertion logic being operative in response to a predetermined availability condition of the buffer to send the provisioned flow control message to the second node; and the message filtering and capturing logic of the second node being operative to continually compare messages received from the first node against the provisioned flow control pause and resume message filters to detect the receipt of a flow control message, and the rate shaping logic being operative in response to the detection of the receipt of the flow control message sent from the first node to take a predetermined flow control action with respect to the transmission of user data to the first node, wherein (1) the processor of the first node is operative when provisioning the flow control message to provision a predetermined portion of the flow control message, the remainder of flow control message being hard-wired, and (2) the processor of the second node is operative when provisioning the flow control message filter to provision a predetermined portion of the flow control message filter, the remainder of each of the flow control pause and resume message filters being hard-wired.

22. A network according to claim 21, wherein the flow control message is a pause message, the predetermined buffer availability condition is a predetermined buffer fullness, and the predetermined flow control action is stopping transmission of the user data from the second node to the first node.

23. A network according to claim 21, wherein the flow control message is a pause message, the predetermined buffer availability condition is a first predetermined buffer fullness, and the predetermined flow control action is stopping transmission of the user data from the second node to the first node and wherein:

the processor of the first node is further operative to provision a user-specified resume message in the message insertion logic of the first node;

the processor of the second node is further operative to provision a user-specified resume message filter in the message filtering and capturing logic of the second node;

the message insertion logic of the first node is operative in response to a second predetermined buffer fullness condition to send the provisioned resume message to the second node; and the message and filtering logic at the second node is operative to continually compare messages received from the first node against the provisioned resume message filter to detect the receipt of a resume message, and the rate shaping logic is operative in response to the detection of the receipt of the resume message sent from the first node to resume the transmission of the user data to the first node.

24. A network according to claim 21, wherein the entire flow control message and the entire flow control message filter are provisionable, and wherein the processors of the first and second nodes are operative when provisioning the flow control message and each of the flow control message filters to provision the entirety of each.

25. A network according to claim 24, wherein each of the flow control pause and resume message filters is compared against a predetermined part and not the entirety of the flow control message.

26. A network according to claim 25, wherein the predetermined part constitutes a predetermined beginning portion of the flow control message.

27. A network according to claim 26, wherein the predetermined beginning portion constitutes a predetermined number of bytes.

28. A network according to claim 21, wherein the flow control action is taken in response to control information provisioned at the second node, and wherein the processor of the second node is further operative to provision the control information at the second node.

29. A network according to claim 28, wherein the control information specifies in one state that the flow control action is to be taken, and specifies in another state that no action is to be taken.

30. A network according to claim 21, wherein the buffer availability condition is a predetermined buffer fullness condition.

31. A network according to claim 30, wherein the buffer fullness condition is user specified.

32. A network according to claim 21, further comprising multiple client links coupled to the first node, and wherein (1) the buffer is a first buffer of a plurality of buffers, each of the buffers being associated with a corresponding one of the client links, (2) the user data is first user data destined for the client link associated with the first buffer, the first user data being carried in a first of a plurality of logical data channels carrying user data destined for corresponding ones of the client links, and (3) the flow control message is a first flow control message carried in a first of a plurality of logical control channels carrying flow control messages pertaining to corresponding ones of the client links.

33. A network node, comprising:
a buffer;
message insertion logic;
message filtering and capturing logic;
rate shaping logic; and
a processor;
the processor being operative to provision a user-specified flow control message in the message insertion logic and a user-specified flow control pause message filter and a user-specified flow control resume message filter in the message filtering and capturing logic;
the buffer being operative to indicate its availability for temporarily storing user data received from another node;
the message insertion logic being operative in response to a predetermined availability condition of the buffer to send the provisioned flow control message to the other node;
the message filtering and capturing logic being operative to continually compare messages received from the other node against each of the provisioned flow control pause and resume message filters to detect the receipt of a flow control message; and
the rate shaping logic being operative in response to the detection of the receipt of a flow control message sent from the other node to take a predetermined flow control action with respect to the transmission of user data to the other node.

34. A network node according to claim 33, wherein the flow control message is a pause message, the predetermined buffer availability condition is a predetermined buffer fullness, and the predetermined flow control action is stopping transmission of the user data from the second node to the other node.

35. A network node according to claim 33, wherein the flow control message is a pause message, the predetermined buffer availability condition is a first predetermined buffer fullness, and the predetermined flow control action is stopping transmission of the user data to the other node, and wherein:
the processor is further operative to provision a user-specified resume message in the message insertion logic
the message insertion logic is operative in response to a second predetermined buffer fullness condition to send the provisioned resume message to the other node;
the message and, filtering logic is operative to continually compare messages received from the other node against the provisioned resume message filter to detect the receipt of a resume message; and
the rate shaping logic is operative in response to the detection of the receipt of the resume message sent from the other node to resume the transmission of the user data to the other node,
wherein (1) the processor of the first node is operative when provisioning the flow control message to provision a predetermined portion of the flow control message, the remainder of flow control message being hard-wired, and (2) the processor is operative when provisioning the flow control message filter to provision a predetermined portion of the flow control resume message filter, the remainder of the flow control resume message filters being hard-wired.

36. A network node according to claim 33, wherein the entire flow control message and the entire flow control resume and pause message filters are provisionable, and wherein the processor is operative when provisioning the flow control message and the flow control message resume and pause filters to provision the entirety of each.

37. A network node according to claim 36, wherein the flow control resume and pause message filters are compared against a predetermined part and not the entirety of the flow control message.

38. A network node according to claim 37, wherein the predetermined part constitutes a predetermined beginning portion of the flow control message.

39. A network node according to claim 38, wherein the predetermined beginning portion constitutes a predetermined number of bytes.

40. A network node according to claim 33, wherein the flow control action is taken in response to control information provisioned at the node, and wherein the processor is further operative to provision the control information at the node.

41. A network node according to claim 40, wherein the control information specifies in one state that the flow control action is to be taken, and specifies in another state that no action is to be taken.

42. A network node according to claim 33, wherein the buffer availability condition is a predetermined buffer fullness condition.

43. A network node according to claim 42 wherein the buffer fullness condition is user specified.

44. A network node according to claim 33, further comprising multiple client links coupled to the node, and wherein (1) the buffer is a first buffer of a plurality of buffers, each of the buffers being associated with a corresponding one of the client links, (2) the user data received from the other node is first user data destined for the client link associated with the first buffer, the first user data being carried in a first of a plurality of logical data channels carrying user data destined for corresponding ones of the client links, and (3) the flow control message sent to the other node is a first flow control message carried in a first of a plurality of logical control channels carrying flow control messages pertaining to corresponding ones of the client links.

45. A method of performing flow control in a network, comprising:

provisioning a user-specified flow control message at a first node;

provisioning a user-specified flow control resume message filter and a user-specified flow control pause message filter at a second node coupled to the first node;

at the first node monitoring availability of a buffer temporarily storing user data received from the second node, and in response to a predetermined availability condition of the buffer, sending the flow control message to the second node; and at the second node, continually comparing messages received from the first node against the provisioned flow control message pause and resume filters to detect the receipt of a flow control message, and upon detecting the receipt of the flow control message sent from the first node, taking a predetermined flow control action with respect to the transmission of user data to the first node, wherein the flow control message is a pause message, the predetermined buffer availability condition is a first predetermined buffer fullness, and the predetermined flow control action is stopping transmission of the user data from the second node to the first node, and further comprising:

provisioning a user-specified resume message at the first node;

at the first node, in response to a second predetermined buffer fullness condition, sending the provisioned resume message to the second node; and at the second node, continually comparing messages received from the first node against the provisioned resume message resume filter to detect the receipt of a resume message, and upon detecting the receipt of the resume message sent from the first node, resuming the transmission of the user data to the first node.

46. A method of performing flow control in a network, comprising:

provisioning a user-specified flow control message at a first node;

provisioning a user-specified flow control message resume filter and a user-specified flow control pause message filter at a second node coupled to the first node;

coupling multiple client links to the first node;

at the first node, monitoring availability of a buffer temporarily storing user data received from the second node, and in response to a predetermined availability condition of the buffer, sending the provisioned flow control message to the second node; and at the second node, continually comparing messages received from the first node against the provisioned flow control message pause and resume filters to detect the receipt of a flow control message, and upon detecting the receipt of the flow control message sent from the first node, taking a predetermined flow control action with respect to the transmission of user data to the first node, wherein (1) the buffer is a first buffer of a plurality of buffers, each of the buffers being associated with a corresponding one of the client links, (2) the user data is first user data destined for the client link associated with the first buffer, the first user data being carried in a first of a plurality of logical data channels carrying user data destined for corresponding ones of the client links, and (3) the flow control message is a first flow control message carried in a first of a plurality of logical control channels carrying flow control messages pertaining to corresponding ones of the client links.

47. A method of performing flow control in a network, comprising:

provisioning user-specified pause and resume frames at a first node;

provisioning a user-specified pause frame filter and a user-specified resume frame filter at a second node coupled to the first node;

at the first node, detecting that a buffer temporarily storing frames of a stream of frames received from the second node has reached a first predetermined fullness, and in response to the detection of the first fullness condition sending the provisioned pause frame to the second node;

at the second node, continually comparing frames received from the first node against the provisioned pause frame filter to detect the receipt of the pause frame, and upon detecting the receipt of the pause frame sent from the first node, stopping the transmission of the stream of frames to the first node;

at the first node, detecting that the buffer has reached a second predetermined fullness less than the first predetermined fullness, and in response to the detection of the second fullness condition sending the provisioned resume frame to the second node; and at the second node, continually comparing frames received from the first node against the provisioned resume frame filter to detect the receipt of a resume frame, and upon detecting the receipt of the resume frame sent by the first node, resuming the transmission of the stream of frames to the first node, wherein the flow control message is a pause message, the predetermined buffer availability condition is a first predetermined buffer fullness, and the predetermined flow control action is stopping transmission of the user data from the second node to the first node, and wherein:

the processor of the first node is further operative to provision a user-specified resume message in the message insertion logic of the first node;

the processor of the second node is further operative to provision said user-specified resume message filter in the message filtering and capturing logic of the second node;

the message insertion logic of the first node is operative in response to a second predetermined buffer fullness condition to send the provisioned resume message to the second node; and the message and filtering logic at the second node is operative to continually compare messages received from the first node against the provisioned resume message filter to detect the receipt of a resume message, and the rate shaping logic is operative in response to the detection of the receipt of the resume message sent from the first node to resume the transmission of the user data to the first node.

48. A method of performing flow control in a network, comprising:

provisioning user specified pause and resume frames at a first node;

provisioning a user-specified pause frame filter and a user-specified resume frame filter at a second node coupled to the first node;

coupling multiple client links to the first node;

at the first node, detecting that a buffer temporarily storing frames of a stream of frames received from the second node has reached a first predetermined fullness, and in response to the detection of the first I fullness condition sending the provisioned pause frame to the second node;

at the second node, continually comparing frames received from the first node against the provisioned pause frame filter to detect the receipt of a pause frame, and upon detecting the receipt of the pause frame sent from the first node, stopping the transmission of the stream of frames to the first node;

at the first node detecting that the buffer has reached a second predetermined fullness less than the first predetermined fullness, and in response to the detection of the second fullness condition sending the provisioned resume frame to the second node; and at the second node, continually comparing frames received from the first node against the provisioned resume frame filter to detect the receipt of a resume frame, and upon detecting the receipt of the resume frame sent by the first node, resuming the transmission of the stream of frames to the first node, wherein (1) the buffer is a first buffer of a plurality of buffers, each of the buffers being associated with a corresponding one of the client links, (2) the user data is first user data destined for the client link associated with first buffer, the first user data being carried in a first of a plurality of logical data channels carrying user data destined for corresponding ones of the client links, and (3) the flow control message is a first flow control message carried in a first of a plurality of logical control channels carrying flow control messages pertaining to corresponding ones of the client links.

49. A network node, comprising:

a buffer;

message insertion logic;

message filtering and capturing logic;

rate shaping logic; and a processor;

the processor being operative to provision a user-specified flow control message in the message insertion logic, a user-specified flow control pause message filter and a user-specified flow control resume message filter in the message filtering and capturing logic;

the buffer being operative to indicate its availability for temporarily storing user data received from another node;

the message insertion logic being operative in response to a predetermined availability condition of the buffer to send the provisioned flow control message to the other node;

the message filtering and capturing logic being operative to continually compare messages received from the other node against the provisioned flow control pause and resume message filters to detect the receipt of a control message; and the rate shaping logic being operative in response to the detection of the receipt of a flow control message sent from the other node to take predetermined flow control action with respect to the transmission of user data to the other node, wherein the flow control message is a pause message, the predetermined buffer availability condition is a first predetermined buffer fullness, and the predetermined flow control action is stopping transmission of the user data to the other node, and wherein:

the processor is further operative to provision a user-specified resume message in the message insertion logic the message insertion logic is operative in response to a second predetermined buffer fullness condition to send the provisioned resume message to the other node;

the message and filtering logic is operative to continually compare messages received from the other node against the provisioned resume message filter to detect the receipt of a resume message; and the rate shaping logic is operative in response to the detection of the receipt of the resume message sent from the other node to resume the transmission of the user data to the other node.

50. A network node, comprising:

a buffer;

message insertion logic;

message filtering and capturing logic;

rate shaping logic;

a processor; and multiple client links coupled to the node;

the processor being operative to provision a user-specified flow control message in the message insertion logic, a user-specified flow control pause message filter, and a user-specified flow control resume message filter in the message filtering and capturing logic;

the buffer being operative to indicate its availability for temporarily storing user data received from another node;

the message insertion logic being operative in response to a predetermined availability condition of the buffer to send the provisioned flow control message to the other node;

the message filtering and capturing logic being operative to continually compare messages received from the other node against the provisioned flow control pause and resume message filters to detect the receipt of a flow control message;

the rate shaping logic being operative in response to the detection of the receipt of a flow control message sent from the other node to take a predetermined flow control action with respect to the transmission of user data to the other node; and wherein (1) the buffer is a first buffer of a plurality of buffers, each of the buffers being associated with a corresponding one of the client links, (2) the user data received from the other node is first user data destined for the client link associated with the first buffer, the first user data being carried in a first of a plurality of logical data channels carrying user data destined for corresponding ones of the client links, and (3) the flow control message sent to the other node is a first flow control message carried in a first of a plurality of logical control channels carrying flow control messages pertaining to corresponding ones of the client links.

* * * * *

UNITED STATES PATENT AND TRADEMARK OFFICE
CERTIFICATE OF CORRECTION

PATENT NO. : 7,304,952 B2 Page 1 of 1
APPLICATION NO. : 10/151792
DATED : December 4, 2007
INVENTOR(S) : Michael D. Scholten It is certified that error appears in the above-identified patent and that said Letters Patent is hereby corrected as shown below:

Column 7, line 1 "Os and Is" should read -- 0s and 1s --;

Column 12, claim 35, line 18, delete "of the first node";

Column 12, claim 35, line 26, "filters being" should read -- filter being --; and Column 15, claim 48, line 8, "first I fullness" should read -- first fullness --.

Signed and Sealed this

Twentieth Day of May, 2008

JON W. DUDAS
*Director of the United States Patent and Trademark Office*